Dec. 1, 1953          M. C. BLANKEN          2,661,047
                MOTOR VEHICLE SEAT STRUCTURE
Filed Jan. 25, 1952                    2 Sheets-Sheet 1

INVENTOR
MAURICE C. BLANKEN
BY Richard Geier
ATTORNEYS

Dec. 1, 1953                M. C. BLANKEN                2,661,047
                      MOTOR VEHICLE SEAT STRUCTURE
Filed Jan. 25, 1952                                 2 Sheets-Sheet 2
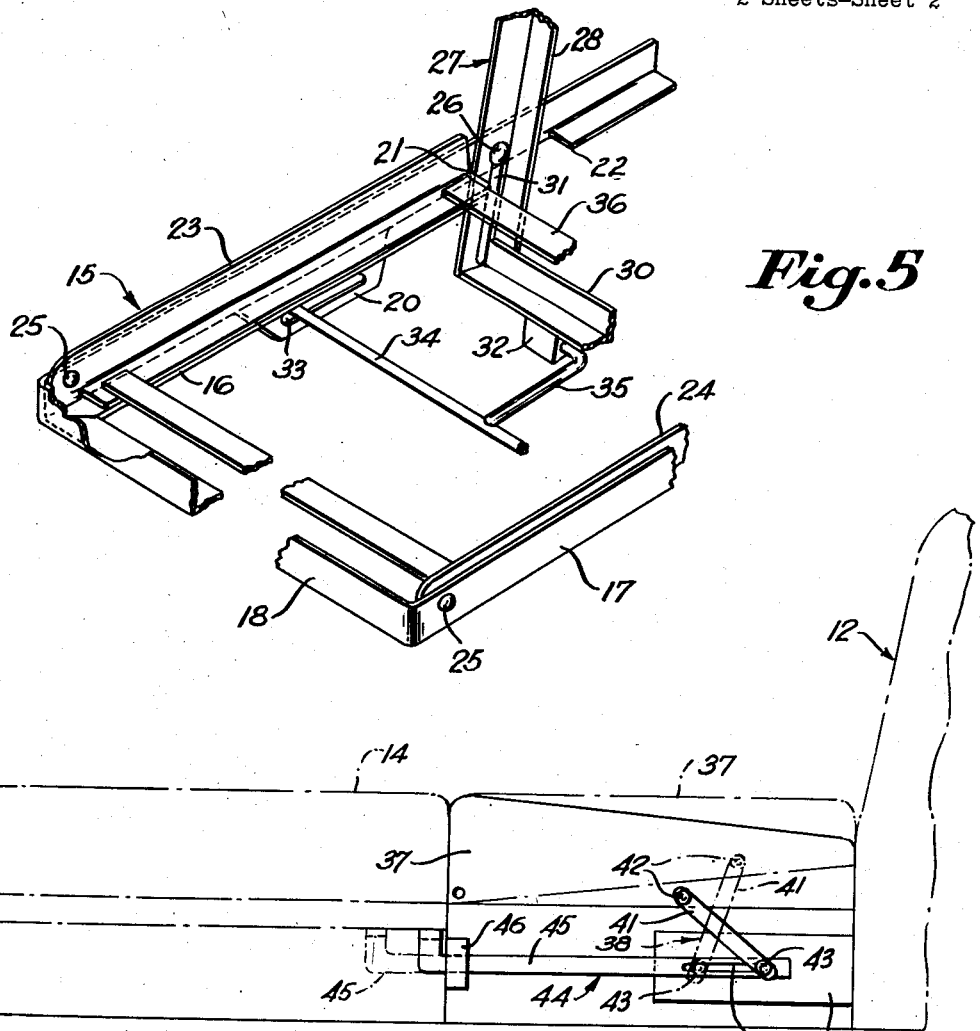
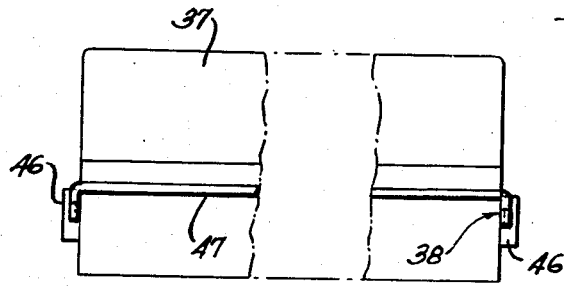
INVENTOR.
MAURICE C. BLANKEN
BY
ATTORNEYS Patented Dec. 1, 1953

2,661,047

UNITED STATES PATENT OFFICE 2,661,047

MOTOR VEHICLE SEAT STRUCTURE

Maurice C. Blanken, Staten Island, N. Y.

Application January 25, 1952, Serial No. 268,247

4 Claims. (Cl. 155—7)

1

This invention relates to improvements in the seat structure of motor vehicles, and more particularly to improvements in automotive seat structure wherein the front and back seats can be converted from the sitting to the prone positions.

It is an object of the instant invention to provide a front and a back seat structure in which the cushions of the front seat and the bottom cushion of the back seat are readily moved in horizontal alignment to form a bed.

A further object is to provide a structure in which the seats are securely held in either the sitting or prone positions.

Other objects of the instant invention will become apparent in the course of the following specification.

In the attainment of the aforesaid objectives, the bottom cushion of the front seat is held by two spaced angle irons pivotally supported at the front of the vehicle and above the floor. The back rest cushion of the front seat is also held by angle irons which protrude below the inner end of the bottom cushion. A linkage system intermediate the protruding ends of the back rest angle irons and the angle irons supporting the bottom cushion maintains both cushions of the front seat in the normal sitting position but by pulling the angle irons of the back rest upwardly while pivoting downwardly, the bottom and back rest cushions of the front seat are brought into substantial alignment in a horizontal plane or the prone position. The inner edge of the back seat bottom cushion, normally inclined in the sitting position, is equipped with an independent linkage system for bringing the inner edge thereof into alignment with the cushions of the front seat in the prone position.

The invention will appear more clearly from the following detailed description when taken in conjunction with the accompanying drawings showing by way of illustration a preferred embodiment of the inventive concept.

In the drawings:

Figure 5 is a fragmentary perspective view of the front seat structure shown in Figure 1;

Figure 6 is an end elevational view of the linkage system for moving the inner end of the bottom cushion of the back seat into alignment

Figure 1:
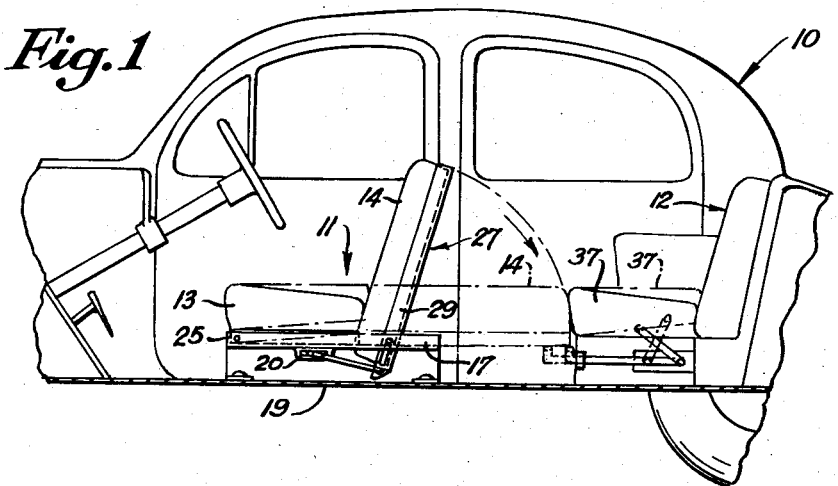
Figure 1 is a fragmentary elevational view of an automotive vehicle in which the front and back seats, constructed in accordance with the principles of this invention, are shown in end elevation.
Figure 2:
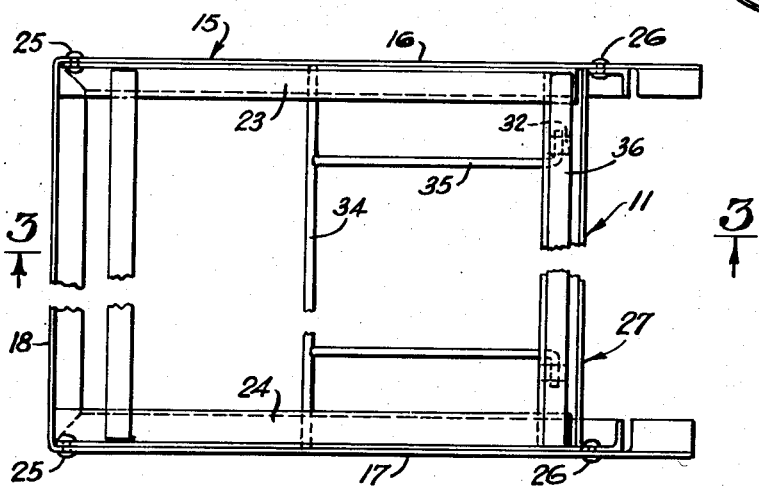
Figure 2 is a plan view of the frame for the front seat shown in Figure 1 in the sitting position but on an enlarged scale.

2 with the cushions of the front seat in the prone position; and

Figure 7 is a fragmentary front elevational view of the back seat and linkage system shown in Figure 6.

Referring now in greater detail to the drawings where like reference numerals indicate like parts, reference numeral 10 indicates a motor vehicle, and 11 the front and 12 the back seat thereof.

The front seat 11 is constituted of the known bottom cushion 13 and the back rest cushion 14. The bottom cushion 13, following the usual practice, is downwardly and rearwardly inclined in the sitting position and is supported by a frame 15 constituted of an outer frame and an inner frame.

Figure 3:
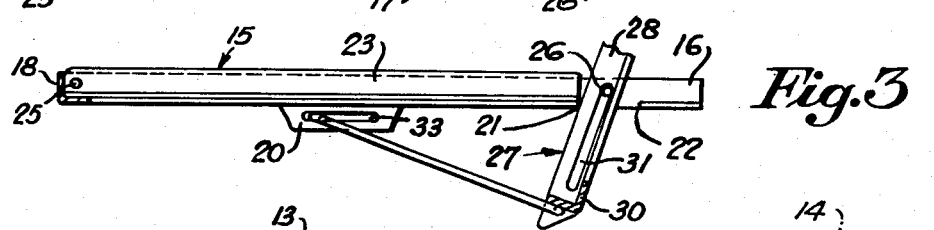
Figure 3 is a sectional view along 3—3 of Figure 2.

The outer frame is constituted of the spaced side members 16 and 17 of angle irons, that is the type where the planes of the integrally formed portions or members or webs form a right angle with each other. At the front of the outer frame 15 is an other angle iron 18 attached to the corresponding ends of the side members by welding or other suitable means. The outer frame is open at the back in order to move the back rest cushion 14 to the prone position shown by the dot-dash lines in Figure 1. The side and front members 16, 17, and 18 are attached in a horizontal plane above the floor 19 (Fig. 1) by any known means. The horizontal webs of the angle irons are inwardly directed at the bottom of the vertical webs. On each side member 16 and 17 is a downwardly directed plate 20, the plates being substantially aligned and having formed therein the aligned horizontal slots 33. Adjacent the open back of the three-piece outer frame, the horizontal webs or portions or members of the side members 16 and 17 are removed intermediate the points 21 and 22 (Fig. 3) for the slidable and pivotal insertion of the later described back rest frame.

The inner frame is constituted of the right angle irons or side members 23 and 24 similar to the previously mentioned angle irons of the outer frame. The outer ends of the side members 23 and 24 are pivotally secured by the like pivot pins 25 to the inner surface of the vertical webs of the previously described side members 16 and 17, respectively, of the outer frame with the horizontal webs of the angle irons of the inner frame resting upon or superposed on the corresponding horizontal surface portions or webs of the outer frame side members 16 and 17. It will be noted in the illustrations that the side members 16 and 17 of the outer frame protrude rearwardly of the corresponding members 23 and 24 of the inner frame. Inwardly directed in the vertical webs of the side members 16 and 17 of the outer frame and adjacent the inner end of the inner frame are the similar pins 26.

Figure 4:
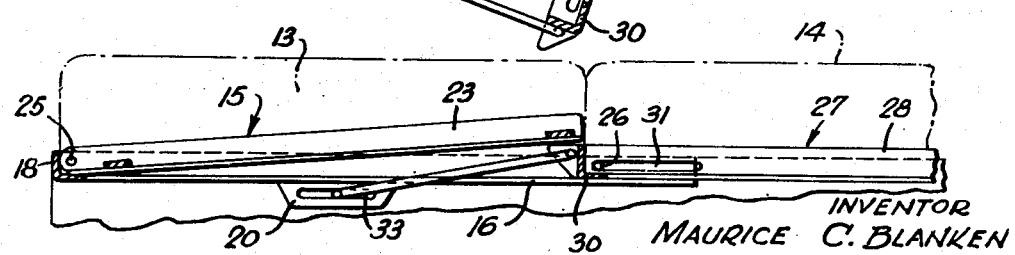
Figure 4 is a view similar to Figure 3 but showing the seat in the prone position.

The back rest cushion 14 of the front seat is supported by the back rest frame 27. The frame 27 is constituted of an angle iron side member 28 (Fig. 5) held in spaced parallel arrangement with a similar side member 29 (Fig. 1) by the bottom angle iron 30 (Figs. 3, 4, and 5) and a similar angle iron (not shown) at the top of the side members. Any suitable means, such as welding, may be used for attaching the members along corresponding ends. The side members at the bottom are provided with the aligned longitudinal slots 31 formed in the upright web, only one of the slots being shown in Figures 3 and 4. Slidably inserted through the slots are the previously mentioned pins 26. By the construction described and illustrated, the bottom of the side members 28 and 29 of the back rest frame are slidably inserted through the openings between the points 21 and 22 in the horizontal webs of the outer frame and protrude below the inner and outer frames.

On the bottom surface of the bottom angle iron 30 a protuberance 32 (Fig. 5) is formed while slidably inserted through the aligned slots 33 of the outer frame is a rod 34 (Fig. 5). Connecting the rod 34 to the protuberance 32 is a link 35, the link being pivotally connected to the protuberance. The linkage system described and illustrated maintains the back rest substantially upright when the rod 34 is at the front of the aligned slots 33.

The length and position of the slots 31 and 33 and the design of the protuberance 32 are correlated so that as the back rest frame is pulled upwardly from the position shown in Figure 5, it can be rotated to the prone position with the inwardly directed webs of the side members of the back rest frame substantially resting on or held by or superposed on the corresponding surface portions of the side members of the outer frame. Simultaneously with the clockwise rotation (Fig. 5) of the back rest frame, the protuberance 32 thereof will come in contact with the brace 36 of the inner frame to pivot the inner end of the inner frame upwardly about the pins 25 to bring the inner edge of the cushion 13 into substantial horizontal alignment with the back rest cushion 14 in the prone position.

Whether or not the back rest frame and the cushion 14 supported thereby in the prone position bridge the gap between the back seat bottom cushion 37 and the front seat is immaterial to the bed structure as later shown.

The back seat cushion 37 is inclined rearwardly and downwardly in the sitting position so that the inner end or edge must be moved upwardly to bring the three cushions in substantially horizontal alignment, that is the inner end of the bottom cushion 37 of the back seat must be brought into substantial alignment with the back rest cushion 14. The linkage mechanism 38 (Figs. 6 and 7), described infra, is used to align the bottom cushion of the back seat with the cushions of the front seat in the prone position.

The linkage mechanism 38 is constituted as follows: A plate 39 (Fig. 6) is attached to the car frame on both sides of the bottom seat, that is the frame supporting the cushion. Of course, the plates 39 could be attached to the seat frame. In each plate 39 is a substantially horizontal slot 40, the plates and slots being aligned. A link 41 is pivotally connected intermediate each side of the frame for the bottom cushion 37 by the pivot pin 42 and the slot 40 by the pivot pin 43 slidable therein. Slidably moving the links 41 in the slots 40 to vary the elevation of the inner end of the cushion 37 is a handle member 44. The handle member 44 is constituted of the side arm 45 and a similar arm on the opposite side of the seat but not shown in the drawings. The inner end of each side arm is pivotally attached to the pivot pin 43 while the opposite or outer end is slidably disposed through an opening in the bracket 46 which is fastened to the seat or car frame in a known manner. The outer ends of the side arms protrude forwardly of the brackets and fastened in a known manner between the protruding ends of the side arms is a member 47. In the prone or sitting position of the cushion 37, the handle member will have the solid line position shown in Fig. 6, that is the member 47 will be in juxtaposition with the front of the seat frame. In the prone position of the cushion 37, the handle member 44 is pulled forwardly of the back seat frame to form an additional support for the frame of the cushion 14 of the back rest frame in the prone position. When the handle member 44 is pulled forwardly from the solid line position shown in Figure 6 to the dot-dash position, the bottom of the links 41 are pulled forwardly which raises the inner end of the cushion 37 to the dot-dash position thereof.

The operation of the front and back seat structures will be understood from the foregoing detailed description. Of course, the mechanism for adjusting the bottom and back rest cushions of the front seat could be used separately from the mechanism for adjusting the inner end of the bottom cushion of the back seat. However, when used together it has been found that the two co-acting mechanisms provide a very simple and inexpensive means for converting the seats of a motor vehicle into a very comfortable bed.

There are some very obvious advantages in the seat structure described and illustrated. It will be apparent that there is no necessity of altering the existing structure of the car body or the chassis in order to install the improved seat structure in any motor vehicle. No complicated action or strenuous effort on the part of the user is required to change the seats from the sitting to the prone position or vice versa. The improved seat structure is especially adapted to small vehicles and production is simple and requires but slight cost.

Since various changes may be made in details within the scope of the claims without departing from the spirit of the invention, it will be understood that subject invention is not to be limited to the specific details shown and described.

What is claimed is:

1. Adjustable front and back seats for an automotive vehicle, the front seat having a bottom and a back rest cushion and the back seat having at least a bottom cushion held by a frame; the adjustable front seat comprising a substantially rectangular outer frame with one open end horizontally disposed in the vehicle adjacent the front thereof and with the open end rearwardly directed, an inner frame for the bottom cushion pivotally disposed in the outer frame adjacent the front and terminating forwardly of the open end of the outer frame, a back rest frame for the back rest cushion pivotally disposed in the outer frame adjacent the inner end of the inner frame and protruding therebelow, means for longitudinally adjusting the back rest frame in the outer frame, means intermediate the protruding end of the back rest frame and the inner frame for pivoting the inner end of the inner frame upwardly when the back rest frame is pivoted rearwardly; and the adjustable back seat comprising a plate disposed on the car frame adjacent each side of the back seat and below the cushion frame the plates having aligned horizontal slots formed therein, a link for each side of the frame of the bottom cushion, means for pivotally securing one end of each link to the frame of the bottom cushion adjacent the inner edge, means for pivotally and slidably securing the free end of each link in the slot of the corresponding plate, a handle member coacting with the ends of the links in the slots, the handle member being in operable engagement with the back rest frame of the front seat when the inner end of the bottom cushion of the back seat is substantially aligned with the cushions of the front seat in the prone position.

2. An automotive vehicle seat adjustable to the sitting and the prone positions, the seat comprising a seat frame and a back rest frame, the seat frame comprising an outer and an inner frame, the outer frame comprising spaced parallel side members of angle irons and a front member and an open back, the horizontal webs of the angle irons being inwardly directed, means for securing the members along corresponding ends, means for securing the outer frame in the vehicle in a substantially horizontal position with the open back directed toward the back of the vehicle, the inner frame comprising spaced parallel side members of angle irons with the horizontal webs thereof inwardly directed, means for pivotally securing the vertical web of one end of each of said side members to the inner surface of the vertical web of one of the side members of the outer frame adjacent the front member, a brace disposed intermediate the free ends of the side members of the inner frame, the side members of the inner frame terminating forwardly of the corresponding members of the outer frame, longitudinally adjustable and pivotal means for securing the back rest frame intermediate the side members of the outer frame adjacent the brace, the back rest frame at the bottom and in the sitting position extending downwardly below the outer frame, and means intermediate the bottom of the back rest frame and the brace for pivoting the inner end of the inner frame upwardly when the horizontal webs of the back rest frame are substantially superposed on the horizontal webs of the outer frame.

3. An automotive vehicle seat adjustable to the sitting and the prone positions, the seat comprising a seat frame and a back rest frame, the seat frame comprising a substantially rectangular outer frame of angle irons the horizontal webs of which are inwardly directed, the frame being open at the back and having aligned portions extending downwardly from the vertical webs thereof, the portions having aligned and substantially horizontal slots formed therein, means for securing the outer frame in a substantially horizontal position above the floor of the vehicle with the open back rearwardly directed, an inner frame coacting with the outer frame, the inner frame comprising two side members of angle irons the horizontal webs of which are inwardly directed, means for pivotally securing one end of the vertical web of each side member to the inner surface of the vertical web of the outer frame adjacent the front, the side members terminating interiorly of the outer frame at the back, a brace disposed intermediate the free ends of the side members, a pin disposed on the inner surface of the vertical web of each side of the rectangular outer frame adjacent the brace, the pins being inwardly directed and aligned, the back rest frame comprising at least spaced side members of angle irons and a bottom member disposed intermediate the bottoms of the side members, the bottom member being below the plane of the seat frame in the sitting position and the side members having formed therein aligned longitudinal slots adjacent the bottom member and coacting with the pins, and means intermediate the bottom member and the brace for pivoting the inner end of the inner frame upwardly when the back rest frame is moved from the sitting to the prone position.

4. An automotive vehicle seat adjustable to the sitting and prone positions, the vehicle having a floor and the seat having an inwardly and downwardly inclined bottom cushion in the sitting position; the seat comprising a seat frame and a back rest frame, the seat frame comprising an outer frame and an inner frame, the outer frame comprising at least two right angle side members, means for securing said members in substantially spaced parallel horizontal arrangement on opposite sides of the vehicle center line and above the floor with the horizontal webs of the side members inwardly directed and at the bottom of the vertical webs, the inner frame comprising at least two right angle members, means for pivotally securing one end of each of said members in the right angle members of the outer frame at the front with the horizontal webs superposed on the corresponding webs of the outer frame, a brace disposed intermediate the inner ends of the side members of the inner frame, the outer frame protruding rearwardly of the inner frame, aligned plates disposed on the outer surface of the vertical webs of the outer frame and protruding there below, the plates having aligned horizontal slots formed therein, a rod slidably disposed intermediate the slots, the horizontal webs of the outer frame having aligned portions removed adjacent the inner end of the inner frame, an inwardly directed pin disposed on the vertical web of each side member of the outer frame adjacent the removed portion, the back rest frame comprising at least two spaced right angle side members slidably disposed through the removed portions of the outer frame, each side member of the back rest having a longitudinal slot formed therein adjacent the bottom, the slot coacting with the inwardly directed pin and the bottom extremity of each side member protruding below the inner frame, a bottom member transversely disposed intermediate the bottom end extremities of the back rest side members, the bottom member having a protuberance formed on the bottom surface thereof coacting with the brace, and a link disposed intermediate the rod and the protuberance with the link pivotally connected to the protuberance.

MAURICE C. BLANKEN.

References Cited in the file of this patent
UNITED STATES PATENTS

| Number | Name | Date |
|---|---|---|
| 1,845,025 | Konzelman | Feb. 16, 1932 |
| 2,039,682 | Clarke et al. | May 5, 1936 |
| 2,059,056 | Sturdevant | Oct. 27, 1936 |
| 2,089,867 | Welch | Aug. 10, 1937 |
| 2,258,119 | Mathe et al. | Oct. 7, 1941 |
| 2,261,519 | Jones | Nov. 4, 1941 |